(12) United States Patent
Paliga et al.

(10) Patent No.: US 10,313,635 B2
(45) Date of Patent: Jun. 4, 2019

(54) VIDEO ANALYTICS SYSTEM FOR AUTOMATED TELLER MACHINE

(75) Inventors: Andrezj Paliga, Carp (CA); Michael Matta, Kanata (CA); David Glick, Kanata (CA); Debbie Pinard, Dunrobin (CA)

(73) Assignee: Solink Corporation, Ottawa, Ontario (CA)

( * ) Notice: Subject to any disclaimer, the term of this patent is extended or adjusted under 35 U.S.C. 154(b) by 378 days.

(21) Appl. No.: 14/117,108

(22) PCT Filed: May 12, 2011

(86) PCT No.: PCT/CA2011/000553
§ 371 (c)(1),
(2), (4) Date: Nov. 12, 2013

(87) PCT Pub. No.: WO2012/151651
PCT Pub. Date: Nov. 15, 2012

(65) Prior Publication Data
US 2014/0232863 A1    Aug. 21, 2014

(51) Int. Cl.
| | |
|---|---|
| H04N 21/84 | (2011.01) |
| H04N 21/234 | (2011.01) |
| G07F 19/00 | (2006.01) |
| H04N 7/18 | (2006.01) |
| H04N 21/231 | (2011.01) |
| H04N 21/278 | (2011.01) |

(Continued)

(52) U.S. Cl.
CPC ............. *H04N 7/18* (2013.01); *G07F 19/207* (2013.01); *G08B 13/19613* (2013.01); *H04N 21/23109* (2013.01); *H04N 21/23418* (2013.01); *H04N 21/278* (2013.01); *H04N 21/4223* (2013.01); *H04N 21/44008* (2013.01); *H04N 21/4431* (2013.01); *H04N 21/84* (2013.01); *G08B 13/19656* (2013.01)

(58) Field of Classification Search
CPC ........................................................ H04N 7/18
See application file for complete search history.

(56) References Cited

U.S. PATENT DOCUMENTS

| | | | |
|---|---|---|---|
| 8,682,032 B2 * | 3/2014 | Fan .................... | G06K 9/6885 |
| | | | 382/103 |
| 9,197,868 B2 * | 11/2015 | Bobbitt ............. | G06K 9/00771 |

(Continued)

*Primary Examiner* — Jayanti K Patel
*Assistant Examiner* — Irfan Habib
(74) *Attorney, Agent, or Firm* — Rosenberg, Klein & Lee (57) ABSTRACT

A video analytics system includes a first database for storing searchable time-stamped transactional data indicative of activity within a monitored system, a second database for storing time-stamped video metadata, wherein the time-stamped video metadata comprises searchable attributes associated with a raw video data stream; and a rule-based correlation server for comparing the time-stamped transactional data with the time-stamped video metadata to identify correlation events indicating potential activity of interest. An output subsystem reports the correlation events from the correlation engine. The analytics system is useful for detecting fraud in ATM transactions by comparing the transactional data, for example, the presence of a transaction, with video metadata, for example, indicating whether a transaction occurs when a person is present, for how long the person is there.

13 Claims, 9 Drawing Sheets

(51) Int. Cl.
  *H04N 21/4223* (2011.01)
  *H04N 21/44* (2011.01)
  *H04N 21/443* (2011.01)
  *G08B 13/196* (2006.01)

(56) References Cited

U.S. PATENT DOCUMENTS

| | | | | |
|---|---|---|---|---|
| 2002/0027164 | A1* | 3/2002 | Mault | G06F 19/00 |
| | | | | 235/462.46 |
| 2004/0155960 | A1* | 8/2004 | Wren | G07G 1/14 |
| | | | | 348/150 |
| 2005/0146605 | A1* | 7/2005 | Lipton | G06F 17/3079 |
| | | | | 348/143 |
| 2006/0225120 | A1* | 10/2006 | Lee | H04N 7/163 |
| | | | | 725/131 |
| 2006/0291695 | A1* | 12/2006 | Lipton | G06K 9/00771 |
| | | | | 382/103 |
| 2007/0058040 | A1* | 3/2007 | Zhang | G06K 9/00771 |
| | | | | 348/150 |
| 2007/0127774 | A1* | 6/2007 | Zhang | G06K 9/00771 |
| | | | | 382/103 |
| 2007/0272734 | A1* | 11/2007 | Lipton | G06Q 20/20 |
| | | | | 235/375 |
| 2008/0072239 | A1* | 3/2008 | Liang | G06F 11/3476 |
| | | | | 719/311 |
| 2008/0218591 | A1* | 9/2008 | Heier | G06Q 20/20 |
| | | | | 348/150 |
| 2009/0060277 | A1* | 3/2009 | Zhang | G06K 9/00711 |
| | | | | 382/103 |
| 2014/0040916 | A1* | 2/2014 | Balakrishnan | G06F 9/542 |
| | | | | 719/313 |

\* cited by examiner

Skimming Installation Module Pseudo-code (401)

For Each VA (Video Analytics) Record
:     IF Person present THEN
:     :     Search TS (Time Sensitive) data for corresponding transaction based on time in/out
:     :     IF not found or suspicious transaction pattern encountered THEN
:     :     :     do further analysis on data
:     :     :     IF skimming installation detected THEN
:     :     :     :     create and store an incident report
:     :     ·     :     :     notify appropriate parties
:     :     :     ENDIF
:     :     ENDIF
:     ENDIF
Next Record

Figure 6

Harvesting Detection Module Pseudo-code (Person-based) (405)

For Each VA (Video Analytics) Record
:     IF Person present THEN
:     :     Search TS (Time Sensitive) data for corresponding transaction based on time in/out
:     :     IF > 1 record found AND card # different THEN
:     :     :     create and store an incident report
:     :     :     notify appropriate parties
:     :     ENDIF
:     ENDIF
Next Record

Figure 7

Harvesting Detection Module Pseudo-code (License-based) (405)

For Each TS (Time Sensitive) Record
:      Get VA data and store license plate + location into a new record
Next Record
Sort all new records by license plate
IF more than 1 record for a single license plate THEN
:      IF enough locations are different THEN
:    :      create and store an incident report
:    :      notify appropriate parties
:      ENDIF
ENDIF

Figure 8

Unauthorized Access Module Pseudo-code (402)

For Each TS (Time Sensitive) Record
:      IF no person scheduled to be in the area THEN
:    :      Get VA data for time period
:    :      IF person(s) present THEN
:    :    :      create and store an incident report
:    :    :      notify appropriate parties
:    :      ENDIF
:      ENDIF
:      IF person scheduled to be in the area THEN
:    :      Get VA data for time period
:    :      IF more than 1 person present OR
:    :    :      person present not the right person THEN
:    :    :      create and store an incident report
:    :    :      notify appropriate parties
:    :      ENDIF
:      ENDIF Next Record

Figure 9

Capacity Detection Module Pseudo-code (403)

For Each TS (Time Sensitive) Record (Time A to Time B to Time C)
:     Get corresponding VA data for Time A to Time B
:     Get corresponding VA data for Time B to Time C
:     IF capacity problem exists between # people in Time A to Time B AND
:     : # people in Time B to Time C THEN
:     :     create and store an incident report
:     :     notify appropriate parties
:     ENDIF
Next Record

Figure 10

Pinpoint Detection Module Pseudo-code (407)

For Each TS (Time Sensitive) Crime Report Record (Time A to Time B)
:     Get perpetrator data
:     For each camera in a defined area
:     :     Get corresponding VA data for Time A to Time B
:     :     IF correlation exists between VA data and perpetrator data THEN
:     :     :     create and store an incident report
:     :     :     notify appropriate parties
:     :     ENDIF
:     Next camera
Next Record

Figure 11

Perpetrator Detection Module Pseudo-code (406)

For Each TS (Time Sensitive) Record with crime committed with the same parameters (e.g. stolen card)
:      Get corresponding VA data
:      create and store an incident report
:      notify appropriate parties
Next Record

Figure 12

Vagrant on Premises Module Pseudo-code (404)

For Each VA (Video Analytics) Record
:      IF same person there for x (programmable) # records in a row THEN
:    :      create and store an incident report
:    :      notify appropriate parties
:      ENDIF
Next Record

Figure 13

VIDEO ANALYTICS SYSTEM FOR AUTOMATED TELLER MACHINE

FIELD OF THE INVENTION

This invention relates to the field of analytics, and more particularly to a video analytics system, useful, for example, fraud detection, and more particularly ATM fraud protection.

BACKGROUND OF THE INVENTION

An automated teller machine (ATM), also known as an automated banking machine (ABM) or Cash Machine is a computerized telecommunications device that provides the clients of a financial institution with access to financial transactions in a public space without the need for a cashier, human clerk or bank teller.

On most modern ATMs, the customer identifies himself by inserting a plastic ATM card with a magnetic stripe or a plastic smart card with a chip, which contains a unique card number and some security information. Authentication is achieved by the customer entering a personal identification number (PIN).

ATMs are placed not only near or inside the premises of banks, but also in locations such as shopping centers/malls, airports, grocery stores, petrol/gas stations, restaurants, or any place large numbers of people may gather. These represent two types of ATM installations: on and off premise. On-premise ATMs are typically more advanced, multi-function machines that complement an actual bank branch's capabilities and thus more expensive. Off-premise machines are deployed by financial institutions and also ISOs (or Independent Sales Organizations) where there is usually only a need for cash, so they typically are the cheaper mono-function devices. In North America, banks often have drive-thru lanes providing access to ATMs.

An ATM typically includes a CPU (to control the user interface and transaction devices), a magnetic and/or Chip card reader (to identify the customer), a PIN Pad often manufactured as part of a secure enclosure, a Secure crypto-processor, generally within a secure enclosure, a Display (used by the customer for performing the transaction), Function key buttons (usually close to the display) or a Touchscreen (used to select the various aspects of the transaction), a Record Printer (to provide the customer with a record of their transaction), a Vault (to store the parts of the machinery requiring restricted access), and a Housing (for aesthetics and to attach signage to).

Encryption of personal information, required by law in many jurisdictions, is used to prevent fraud. Sensitive data in ATM transactions are usually encrypted with DES, but transaction processors now usually require the use of Triple DES. Remote Key Loading techniques may be used to ensure the secrecy of the initialization of the encryption keys in the ATM. Message Authentication Code (MAC) or Partial MAC may also be used to ensure messages have not been tampered with while in transit between the ATM and the financial network.

There are various methods by which criminals attempt to defraud the system. Card skimming or card cloning involves the installation of a magnetic card reader over the real ATM's card slot, which is not easily detectable. The devices used are smaller than a deck of cards, and are used in association with a wireless surveillance camera or a digital camera that is hidden to observe the user's PIN. Card data is then cloned onto a second card and the criminal attempts a standard cash withdrawal. The availability of low-cost commodity wireless cameras and card readers has made it a relatively simple form of fraud, with comparatively low risk to the fraudsters. Criminals tend to attach skimming devices either late at night or early in the morning, and during periods of low traffic. Skimming devices are usually attached for a few hours only because of battery life in the camera. It is estimated that globally, financial institutions are losing over a billion dollars annually to card skimming.

Customers count on ATM security, but with ATM skimming on the rise, customer confidence is threatened. 67% of U.S. adults who use banking ATMs would be likely to switch institutions after an instance of ATM fraud or data breach. It is essential that financial institutions take corrective measures to ensure banking security.

Rules are usually set by the government or ATM operating body that dictate what happens when integrity systems fail. Depending on the jurisdiction, a bank may or may not be liable when an attempt is made to dispense a customer's money from an ATM and the money either gets outside of the ATM's vault, or was exposed in a non-secure fashion, or they are unable to determine the state of the money after a failed transaction.

In an attempt to stop these practices, countermeasures against card cloning have been developed by the banking industry, in particular by the use of smart cards which cannot easily be copied or spoofed by unauthenticated devices, and by attempting to make the outside of their ATMs tamper evident. Older chip-card security systems include the French Carte Bleue, Visa Cash, Mondex, Blue from American Express[1] and EMV '96 or EMV 3.11. The most actively developed form of smart card security in the industry today is known as EMV 2000 or EMV 4.x.

EMV is widely used in the UK (Chip and PIN) and other parts of Europe, but when it is not available in a specific area, ATMs must fallback to using the easy-to-copy magnetic stripe to perform transactions. This fallback behavior can be exploited. Card cloning and skimming can be detected by the implementation of magnetic card reader heads and firmware that can read a signature embedded in all magnetic stripes during the card production process. This signature known as a "MagnePrint" or "BluPrint" can be used in conjunction with common two factor authentication schemes utilized in ATM, debit/retail point-of-sale and pre-paid card applications.

Another ATM fraud issue is ATM card theft which includes credit card trapping and debit card trapping at ATMs. Originating in South America this type of ATM fraud has spread globally. Although somewhat replaced in terms of volume by ATM skimming incidents, a re-emergence of card trapping has been noticed in regions such as Europe where EMV Chip and PIN cards have increased in circulation.

A Lebanese loop is a device used to commit fraud and identity theft by exploiting automated teller machines (ATMs). Its name comes from its regular use amongst Lebanese financial crime perpetrators, although it has now spread to various other international criminal groups. The Lebanese loop is becoming one of the simplest and most widespread forms used to perpetrate ATM fraud by retaining the user's card. In their simplest form, Lebanese loops consist of a strip or sleeve of metal or plastic (even something as simple as a strip of video cassette tape) that is inserted into the ATM's card slot. When the victim inserts their ATM card, the loop is sufficiently long enough for the card to be fully drawn into the machine and read. The victim then enters their PIN as normal, and requests the funds. The ATM then tries to eject the card, but a "lip" folded at the end of the loop prevents the card from being ejected. The machine senses that the card has not been ejected, and draws the card back into the machine. The cash drawer does not open, and the money that has been counted is retained by the machine. In most cases, the victim's account is not debited. The victim believes the machine has malfunctioned or genuinely retained their card. In some cases, the fraudsters attach a small camera to the ATM to record the victim entering their PIN. The video from this camera is then transmitted to the fraudsters, who may be waiting near the machine and viewing the video on a laptop computer meaning they need not approach the victim directly. There have been cases where a fake keypad is fitted to the machine over the top of the real one, and this records the PINs entered. Once the victim has left the ATM, the perpetrator retrieves the loop and the trapped card, and uses it, along with their PIN, to withdraw cash from the victim's account.

There are different types of cameras used at locations for security purposes. One type is expensive, and does video analytics itself, or is combined with an expensive encoder attached to the camera (the embedded video analytics automatically monitor the video by watching for motion detection, object recognition and many other security threats). The other is much less expensive and just takes video, from which images can be extracted from every set time period. In both cases, the cameras run continuously.

Various approaches are currently used to address the problem of ATM fraud.

Diebold sell ATM machines. Their card-skimming technology includes ATM card-reader security designed to deter skimmer attachment, an alert system that warns bank personnel thieves have attached a skimming device to an ATM and an electromagnetic field that interferes with a skimmer's ability to capture a card's magnetic-stripe data.

Diebold's monitoring center also issues real-time e-mail alerts and text messages warning bank employees of skimming attacks.

Customers have to buy their equipment; therefore it is not a solution for installed base.

ADT has CPK+ (Card Protection Kit) technology, an advanced anti-skimming protective device installed inside the ATM near the ATM's card reader. CPK+ helps prevent the skimming of card data by emitting an electromagnetic field to interrupt the operation of an illegal card-reader head, without interrupting the customer transaction or the operation of most ATMs. They also have Surface Detection Kit (SDK); the SDK sensor helps detect foreign devices placed near or over the ATM card-entry slot, whether made of plastic, paper, iron or wood. Upon detection, it relays output signals, triggering silent alarms for monitoring center response, or to coordinate DVR surveillance sequencing of skimming activities.

ADT Anti-Skim sensing devices can be integrated with ATM or vestibule surveillance DVRs for video documentation and sequencing of skimming activities and corresponding ATM customer transactions.

ADT also has Monitoring Centers to monitor the ATM security program, and the customer can receive real-time notification of ATM skimming occurrences and law enforcement or security can be dispatched to review ATMs in alarm or remove detected skimming devices.

ATM Secure has a product Shadow Shield-ECS which offers the ability to provide an electronic shield in the vicinity of the card reader, thus providing a jamming protection shield. This prevents any card reading-skimming device from collecting data, when placed within a 100 mm radius of the ATMs card reader. In addition to this, Shadow Shield-ECS transmits a signal that is designed to confuse and corrupt data collected by an attached skimmer.

They also have SED-E-field which provides an electronic sensing area around the ATM card slot, and can detect the presence of foreign objects like card skimming devices. Once detected, the SED-E-field can send an alarm signal to the security system, alerting of the detection.

Wincor Nixdorf sells ATM machines. They have increased even further the security in and around ATMs with the software solution ProView for the remote monitoring of self-service banking systems. Monitoring of anti-skimming modules has now been integrated into the bank machine. Anti-skimming modules are equipped with special sensors that check the area around the card insertion point for illicitly installed attachments. If such a module detects anything suspicious, it sends an "event" to ProView, which immediately initiates a variety of protective measures: for instance, it can activate a camera, photograph the perpetrator, take the ATM offline and generate a report to the service provider. If the camera monitoring an ATM fails, ProView can also take the machine offline.

They also have an anti-skimming mechanism, which is a plastic insert that can be mounted in the card reader slot. The shape of the special insert is designed to prevent tampering with skimming mechanisms but, at the same time, does not restrict ATM usage. The anti-skimming mechanism is equipped with security technology that puts the machine out of service as soon as the insert is destroyed or the machine removed by force.

Customers have to buy their equipment; therefore it is not a solution for installed base.

Jitter technology works via a stop start or jitter motion inside the card drive specifically designed to distort the magnetic stripe details should they be copied onto a foreign card reader inserted into the ATM.

Video Analytics, also known as IVS (Intelligent Video Surveillance) is a new emerging market for security allowing its users to easily monitor and secure areas with security cameras. With this new state of the art technology, businesses can easily monitor places of interest with sophisticated software that makes detecting threats or unwanted visitors simple and effective.

Intelligent Video Surveillance consists of algorithms that detect movement or changes in live and recorded video to see whether the movement or changes mean a possible threat is about to occur or occurring. These algorithms work by examining each pixel of the video and putting together all the pixel changes. If many pixels are changing in one area and that area is moving in a direction, the software considers this to be motion. Depending on the policies and alerts that have been setup, the bank will be notified of this motion. Other actions can be automatically taken by the as motion tracking which follows the motion until it is no longer detected. It can include Loitering Detection, Queue Length Monitoring and Facial Detection, among other things.

There are various problems with current solutions. Jitter is a security feature, but it helps only for simple skimmers. With motorized skimmers or extended skimmers, only a sensory solution will offer protection because magnetic stripe data still can be read.

Sensor detection does not work well, because it can be set off by a customer's electronic device like a cell phone or iPod.

New video cameras are very expensive, and can be prohibitive from a cost point of view given the number of ATMs that would have to be fitted with the cameras.

No current solution targets cash harvesting, which occurs when the thieves take the money out using the fake cards. No current solution can warn of skimmer installation.

US patent application no. 2008/0303902 describes a system for collecting video data and transactional data and correlating the two. However, this system is bandwidth intensive because the video data is processed along with the transactional data, and is thus not suitable for large-scale systems.

SUMMARY OF THE INVENTION

According to the present invention there is provided a video analytics system comprising
a first database for storing searchable time-stamped transactional data indicative of activity within a monitored system; a second database for storing time-stamped video metadata; a correlation server for comparing the time-stamped transactional data with the time-stamped video metadata to identify correlation events indicating potential activity of interest; and an output subsystem for reporting the correlation events from the correlation server.

In one embodiment the time-stamped video metadata comprises searchable attributes associated with a raw video data stream, but it could also be data indicative of a customer session, where the customer is detected by analyzing the frames of the video to detect the presence of a person or just mere motion in the video image.

It will be appreciated that the first and second databases could be physically separate entities, or could in the alternative equally well be part of the same physical storage medium.

A feature of invention is the conversion of the rawvideo data into searchable, time-stamped metadata, which can then be stored and correlated without consuming large amounts of bandwidth. A large number of facilities can be monitored at a central location without consuming unmanageable amounts of bandwidth. For example, in the case of an ATM machine, the metadata may indicate the presence of a person in front of the machine. This can then be correlated against the transaction data to confirm that a transaction did take place. If there was no transaction, the raw video data, or frames thereof, can be view to identify the person or see whether there were performing an illegal activity, such as installing a skimming device.

The output subsystem may be a correlation database for storing the correlated data for subsequent review. It could also be part of a monitoring station for attracting the attention of a supervisor.

The invention is particularly applicable to ATM fraud detection, but this is just one example of a more general embodiment of the invention that takes two or more independent data streams, time stamped data and time stamped video, and correlates them using time and location and runs an analysis to detect when relevant information is present. This correlation and analysis can be applied to other situations as well. It could be done at a point of sale terminal, when a badge is swiped, when a door is opened or closed, when an area (like a store) is open or closed, when a traffic light is red, green or yellow, when a fire alarm is pulled, etc., or any time there is video data and other time sensitive data that is being stored at the same time. In accordance with embodiments of the invention, by correlating the video metadata extracted from the raw video with other transactional data avoids the need to correlate the transactional data directly with the raw video.

Embodiments of the invention thus provide an advanced data analytic system that uses video/picture metadata and time sensitive data (which could be ATM transactions, badge swiping, retail transactions, traffic light schedules, operating hours, crime patterns, emergency situations, etc.) and uses customizable rules to detect a predefined activity. It uses an algorithm or correlation engine to do a proactive analysis, and when a possible problem is found, it can alerts the appropriate person(s) to the activity discovered.

The video can be in the form of metadata obtained from embedded analytics created by a camera and stored on site in a DVR. Such intelligent cameras are however expensive and if not already in place would need to be specially installed. Embodiments of the invention also provide a much more economical solution, which is to take existing video shot from normal cameras, and create the metadata at a centralized location. No software has to reside locally where the cameras are, and all processing and storage is done centrally. This then creates a searchable record of the metadata taken from the images (license plate, height, colors, facial features etc.). If a company is already streaming video to a location like a security room (and the video is not stored anywhere), then a 'filter' could be put on this stream which can extract analytics or images on the fly and send them to the centralized location. Another way of conserving bandwidth is to have a trigger, such as motion detection or a transaction which tells the system to capture images for a particular time frame to determine the start and stop time for the session.

Embodiments of the invention can, for example, be used to determining that there is someone at an ATM with no corresponding transaction, suggesting a possible skimmer installation, or determine that the same person did many transactions in a row at the same ATM using different cards, suggesting possible cash harvesting. Another application is to determine that there is an unauthorized person present in a building during off hours by using the guard schedule (either pre-programmed, or done in real time by badge swiping in different areas), suggesting a possible break-in. Further applications include determining that the same license plate is seen at many different ATM branches, suggesting possible cash harvesting, determining that after a badge swipe, the wrong person or the wrong number of people are in an area, suggesting possible theft or fraud, determining that the same person used a stolen card at one or more locations, suggesting possible theft.

Also, if it is known that a crime took place at a certain date/time/place, video analytics taken from different cameras in the area can be used to track the person, or for example a hit and run in a parking lot, to determine the license plate. Using video analytics from a subway station combined with the subway schedule to determine if there is enough capacity on the trains at various times of the day.

The solution lets the user configure at least one variable that influences whether an activity is to be flagged or not. This can be done through a user interface, or an Application Programming Interface (API).

It also can display the results in a unique way making it very easy for a user to find significant instances.

Embodiments of the invention correlate video and data evidence that might otherwise take days to collect, and present it to a customizable set of users in an organized dashboard. This enables users to, for example, detect fraud crimes quickly, investigate them easily, and ultimately reduce the losses they cause. Once they are alerted, users can drill down into the data and retrieve all the correlated and relevant information. In the case of fraud detection, this dramatically improves investigation capabilities, reduces the time and cost per investigation, and produces superior evidence for prosecution purposes.

There is no need for local hardware at each site; therefore there are no protocol or encryption issues.

Embodiments of the invention permit the user to search network-wide on a broad range of customized transaction data fields, use simple refinement tools to drill down into relevant video and data, combine desired data and synchronized video into compelling files with interactive case notes, and export video clips, images, case notes and/or receipt data for easy use by enforcement personnel.

Another aspect of the invention provides a method of monitoring a site for activity of interest, comprising storing searchable time-stamped transactional data indicative of activity at the site; storing time-stamped video metadata; and performing a rule-based correlation server of the time-stamped transactional data with the time-stamped video metadata to identify correlation events indicating potential activity of interest, and reporting the correlation events.

In yet another aspect the invention provides a video analytics system comprising a video analytics system comprising a first database for storing searchable time-stamped transactional data indicative of activity within a monitored system; a second database for storing time-stamped metadata indicative of the presence of a person at a location monitored by a video camera producing a raw video stream; a correlation server for comparing the time-stamped transactional data with the time-stamped metadata to identify correlation events indicating potential activity of interest; and a module for analyzing video data corresponding to a correlation event.

In this embodiment, the analytics are triggered by, for example, the detection of a person in the view of the camera. In this embodiment the system detects a person and then determines whether there is a matching transaction.

In one embodiment the video analytics module is configured to identify the presence of a person by carrying out the following steps:
1) retrieve any available data with a time-stamp;
2) retrieve one or more video frames corresponding to the time-stamp;
3) analyze the retrieved frames to identify correlation events; and
4) store the retrieved video frames or raw video stream associated with correlation events.

This embodiment of the invention also conserves bandwidth because the person detection is performed on individual frames rather than the video stream.

BRIEF DESCRIPTION OF THE DRAWINGS

The invention will now be described in more detail, by way of example only, with reference to the accompanying drawings, in which:—

DETAILED DESCRIPTION OF THE INVENTION

The invention will be described by reference to one exemplary use of the video analytics system, which is for ATM fraud detection.

In this embodiment, the ATM video and transaction records are converted into searchable data. This can be used to detect people approaching and loitering at an ATM, capture total time at ATM facility, target skimming device installation or removal, detect multiple card use per session as indicator of cash harvesting, and detect cars being used at more than one ATM.

Investigator performance can be improved by filtering data daily to flag all new threats automatically, consolidating all data and video events in a single, organized dashboard, creating notification of alarms.

Any bank or credit union is able to providing customizable alarms that can be tailored to detect the specific behaviors each institution requires, allowing new rules to be tested against historical data to more quickly uncover new fraud patterns, and solve a cost problem of expensive cameras that have video analytics by providing a lower cost software solution that does the same thing.

Figure 1:
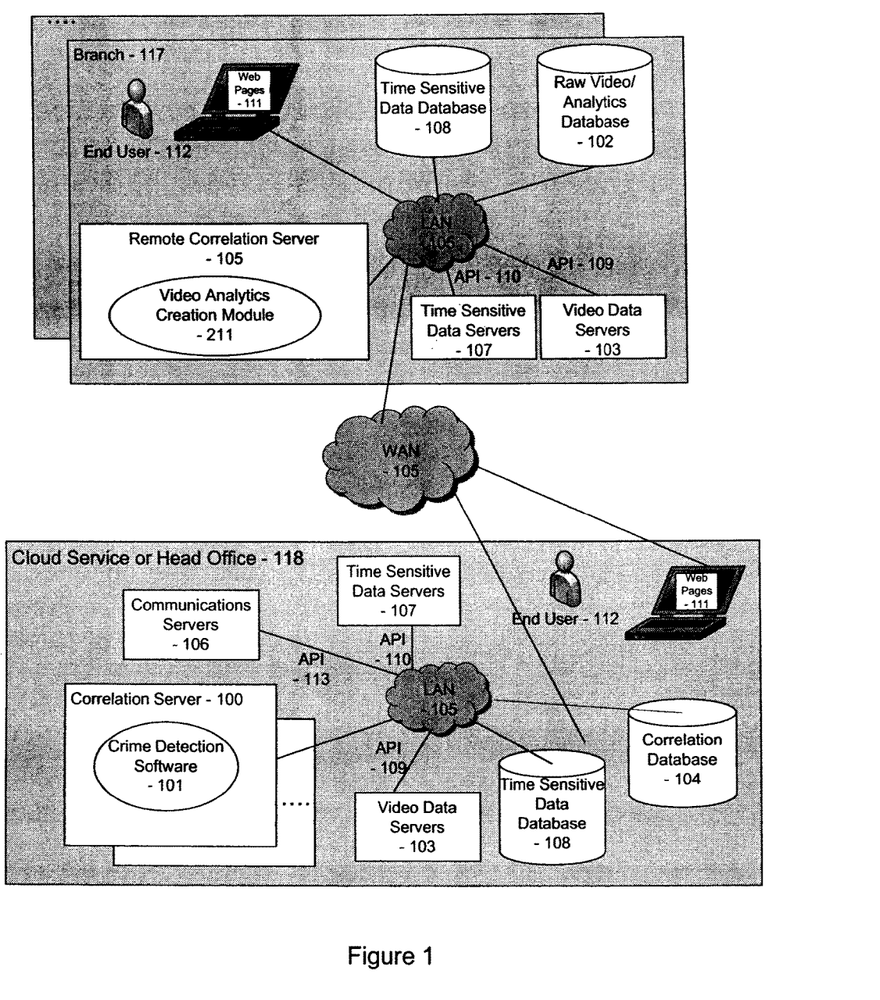
FIG. 1 is a block diagram of a video analytics system in accordance with one embodiment of the invention.

Referring now to FIG. 1, the system contains multiple time sensitive servers 107 connected to the LAN/WAN 105 that contain time sensitive data, such as ATM transactions, or guard schedules, or train/subway schedules. These store the information in Databases 108, and provide an API 110 to access this data. They can reside in a Branch Office 117, or in a Cloud Service or Head Office 118.

Another source of data comes from Video Data Servers 103 connected to the LAN/WAN 105. These servers provide access to raw video data or video analytics data, derived from the raw video data as searchable metadata, stored in Raw Video/Analytics Databases 102. They can reside in a Branch Office 117, or in a Cloud Service or Head Office 118.

The Correlation Server 100 contains Crime Detection Software 101, responsible for using the time sensitive data and the video metadata to determine if there is fraudulent activity in accordance with a predetermined, but configurable, set of rules. It can also have a remote function running on a Remote Correlation Server 105, which can run the Video Analytics Creation Module 211 to create video analytics from raw video. If fraudulent activity is found, it stores the information in correlation Database 104. Database 104 also contains any image references, a copy of the time sensitive data, and the video and video analytics (which can come from the Video Data Server 103, or could have been created by the Remote Correlation Server 105 from raw video).

The video metadata or video analytics is searchable time-stamped data associated with the video as well as other information about the video. For example, the video analytics may detect a person present in front of an ATM machine. The video metadata includes this searchable tag, which may be stored in association with an image of the person. Also, face recognition software might be used to tag the person with a particular identity, either known or unknown. The latter might be useful, for example, to determine that the same person withdrew cash from different machines within a specified time frame, as this could indicate cash harvesting.

The metadata can be derived from the video either at the source, using a more expensive camera, or by the system, for example, using the correlation server. To avoid using up unnecessary bandwidth, in a scenario where a bank branch has an installed base of dumb cameras, the analytics could be done on the local network at the branch so that only the metadata need to be sent to a central monitoring or analysis station. Alternatively the raw video could be sent to the central monitoring station for analysis, but this would require more bandwidth.

Communications Servers 106 are also connected to the LAN/WAN 105, which provide a standard API 113 that lets the Correlation Server 100 handle any communication that is sent to a programmable set of interested parties when an incident occurs. Examples of communications sent are email, SMS, voice calls, tweets, chats, pages, etc.

Users 112 can access the data in Database 104, set up parameters for the system, configure the rules for determining the fraudulent activity and cause analysis to be done by using web pages 111 that are connected through the LAN/Wan 105 to the Correlation Server 100. The User 112 can also view incidents, search incidents, view the video associated with the incidents, view the data associated with the incidents, and add notes to the incidents. These APIs are implemented using known techniques.

Figure 2:
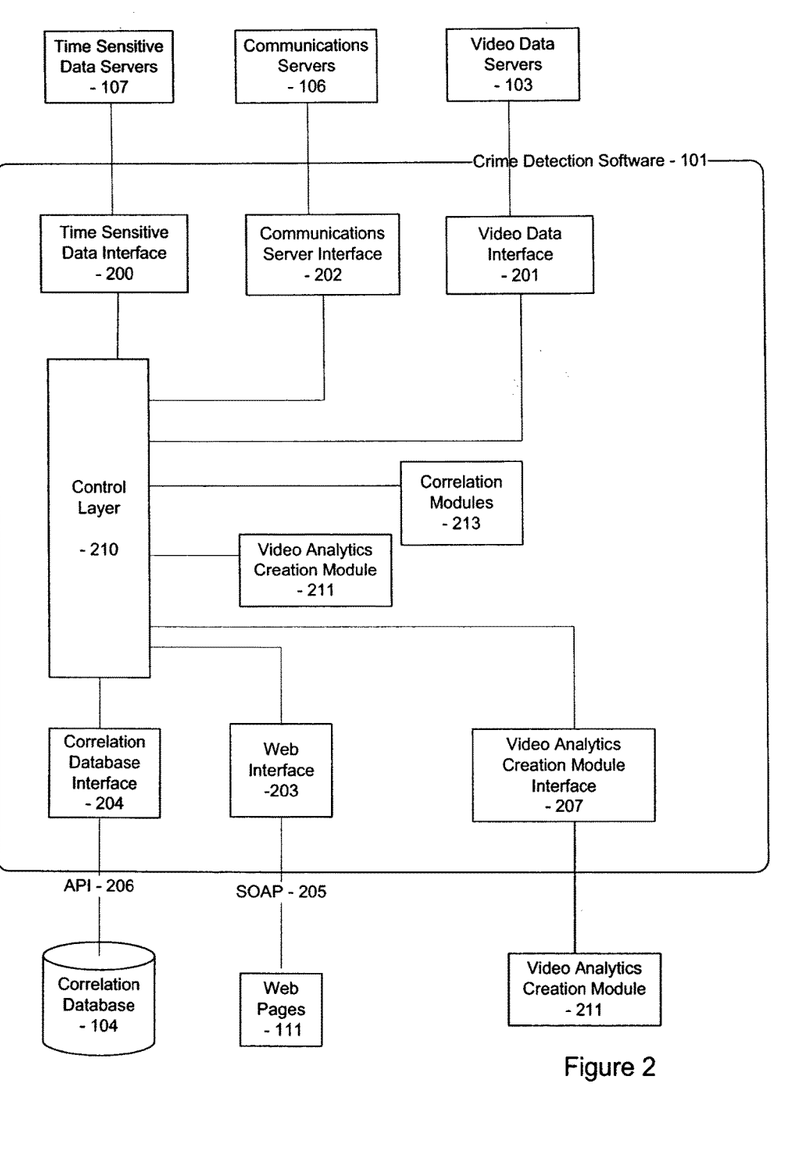
FIG. 2 is a more detailed block diagram of the correlation server.

FIG. 2 is a more detailed view of the Correlation Server 100. This includes a Time Sensitive Data Interface module 200, which handles the different APIs 110 that are used by the Time Sensitive Data Servers 107. The correlation server 100 also includes a Video Data Interface module 201, which handles the different APIs 109 that are used by the Video Data Servers 103. There is a Communications Server Interface module 202, which handles the different APIs 113 that are used by the Communications Servers 107. The correlation server also includes video data interface 203, which interfaces with video data servers 103. These APIs also provide access to the data in Raw Video/Analytics Database 102. These components all managed by the Control Layer 210.

Figure 13:
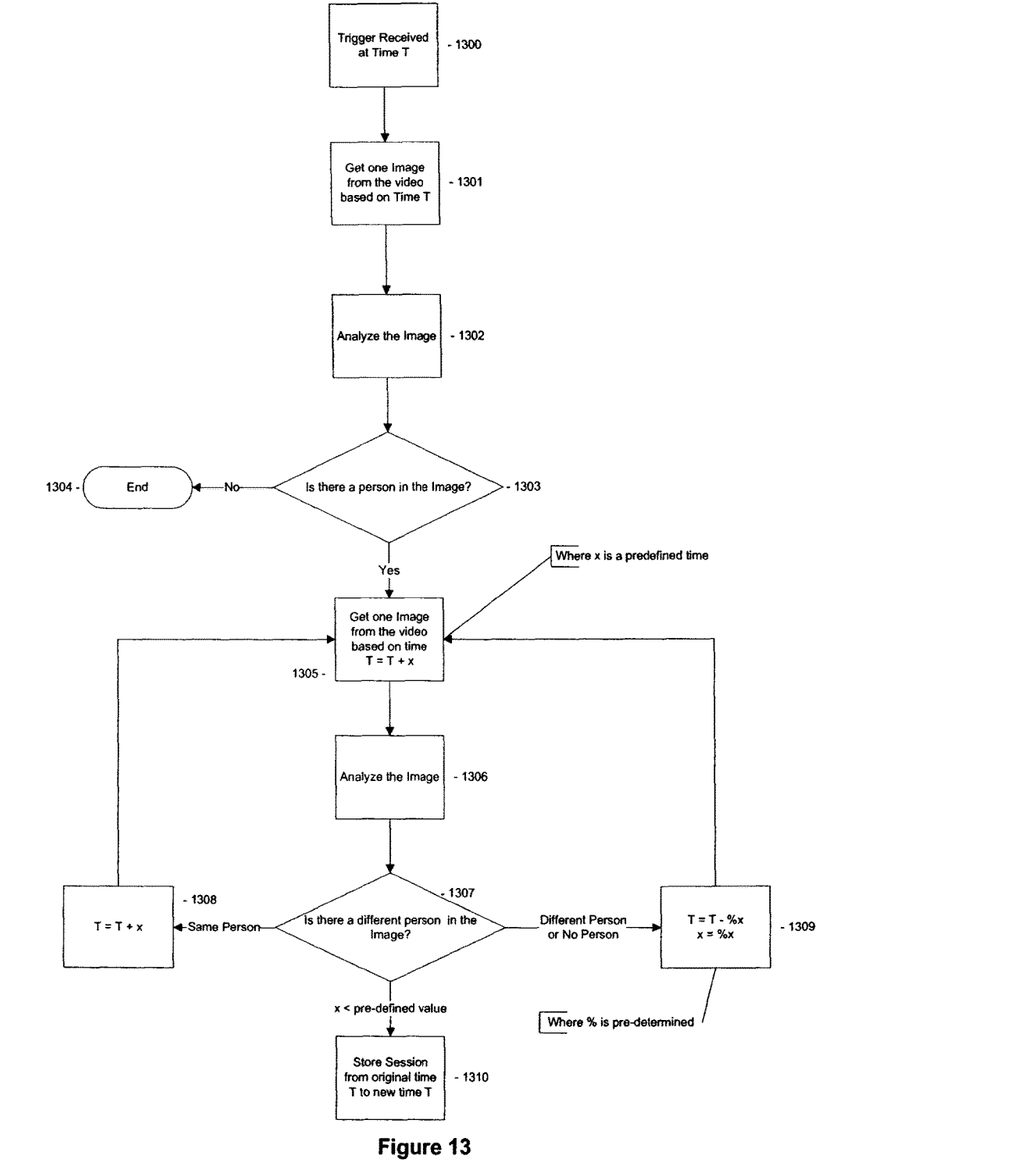
FIG. 13 is a flow chart of an exemplary bandwidth-efficient embodiment for creating a session to perform video analytics.

This control layer is responsible for coordinating all the activity that goes on within the correlation server. The Video Analytics Creation Module 211 uses video analytics algorithms to extract data from a given standard video or set of images. It can also be asked by the Get, Decompose and Store Video Data module 301 (see FIG. 3) to analyze the video frame by frame as shown in FIG. 13. This reduces bandwidth since when it is done, there is no need to download the video, just a couple of frames and the analytic information on what happened during the determined time period. This can be done locally, or it can reside on a remote server and is accessed through a Video Analytics Creation Module Interface 207. There is a Web Interface 203 which talks to Web Pages 111 in a standard way, for example using SOAP 205. There is a Correlation Database Interface 204, which uses a standard database API 206 to get and store data in the Correlation Database 104. There are a set of pluggable Correlation Modules 213, which does the work of finding incidents and reporting on them.

Figure 3:
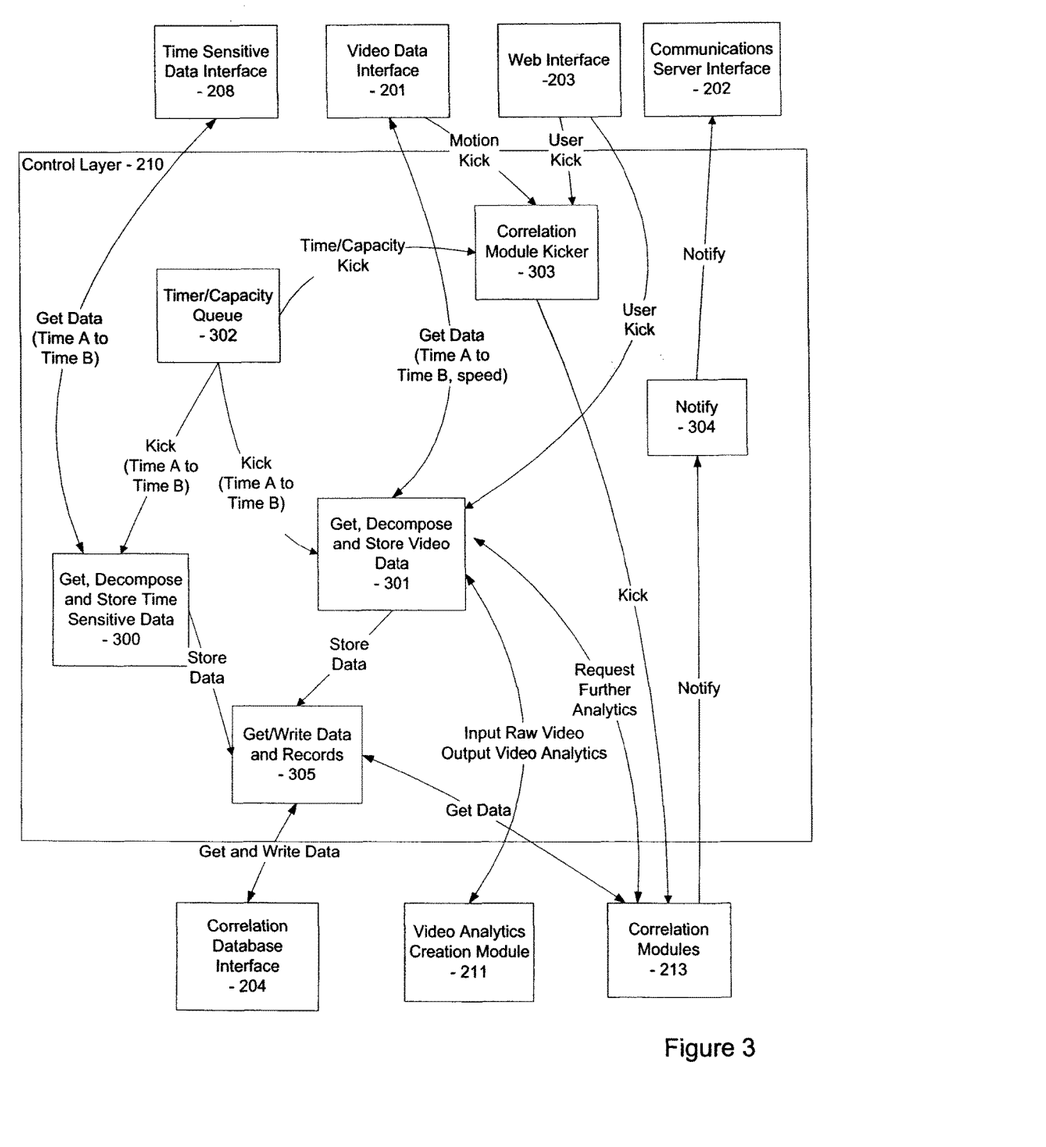
FIG. 3 is a flow diagram illustrating operation of the system.

FIG. 3 shows a Get, Decompose and Store Time Sensitive Data module 300, which when it is told to do so by the Timer/Capacity Queue 302, it is responsible for interfacing to the Time Sensitive Data Interface 208 to get time sensitive data for a particular time frame, break it up into different records, and store these records in the Correlation Database 104, by using the Write/Get Data and Records module 305.

The Get, Decompose and Store Video Data module 301, when it is told to do so by the Timer/Capacity Queue 302, is responsible for interfacing to the Video Data Interface 208 to get video data for a particular time frame, (and at a specific frame/sec rate in the case of video—to conserve bandwidth), break it up into different records, and store these records in the Correlation Database 104, by using the Write/Get Data and Records module 305. If it is retrieving straight video, it takes the video and passes it to the Video Creation Module 211, which uses standard techniques to extract video analytics from the passed in data, which are given back to be stored in the database.

The Timer/Capacity Queue 302 is also responsible for deciding when to kick the Correlation Module Kicker 303, based on either time, or a certain capacity of data being reached. It keeps track of which correlation modules need to be kicked, and what the trigger is.

The Correlation Module Kicker 303 is used to kick or activate the various Correlation Modules 213. It is told to do this either by the Timer/Capacity Queue 302, by the Web Interface 203 (when a User 112 decides they want to), or the Video Data Interface 201, which can be programmed to receive a motion trigger, which in turn can kick the Correlation Module Kicker 303.

When a User 112 wants to access the data in the Correlation Database 104, the Web Interface 203 uses the Write/Get Data and Records module 305 which in turn talks to the Correlation Database Interface 204 to retrieve the data. The Web Interface 203 is responsible for formatting the data and sending it to the Web Pages 111. The user can also request to have a particular video analyzed, and certain characteristics searched for. The Web Interface 203 kicks the Get, Decompose and Store Video Data module 301 to do this.

The Write/Get Data and Records module 305 gets requests to store data and records from the Get, Decompose and Store Time Sensitive Data module 300, and the Get, Decompose and Store Video Data module 301. It retrieves data for the Web Interface module 203 and the Correlation Modules 213. The Correlation Modules 213 also use it to store records that they create.

The Notify module 304 is used by the Correlation Modules 213 to talk to the Communications Server Interface to send out various types of communications to a programmable group of people.

Figure 4:
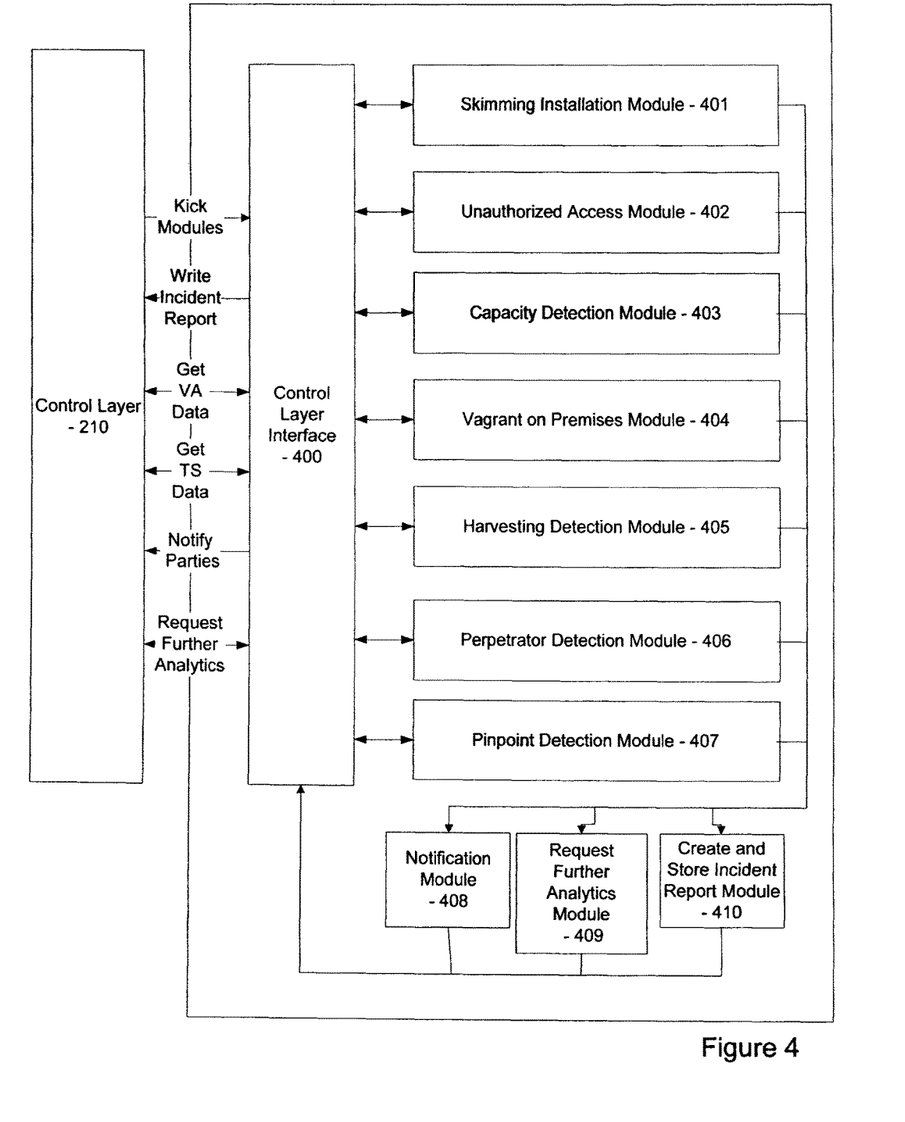
FIG. 4 is a block diagram of the correlation server.
Figure 5:
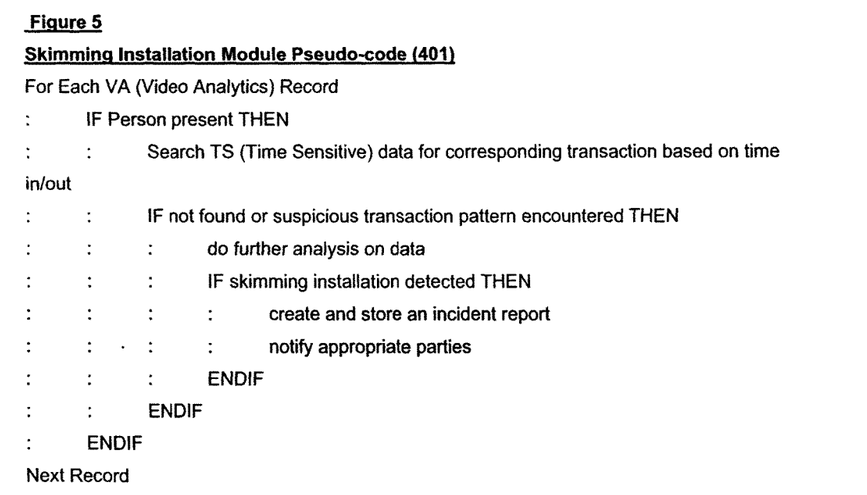
FIG. 5 is the pseudo code for a skimming installation module.
Figure 6:
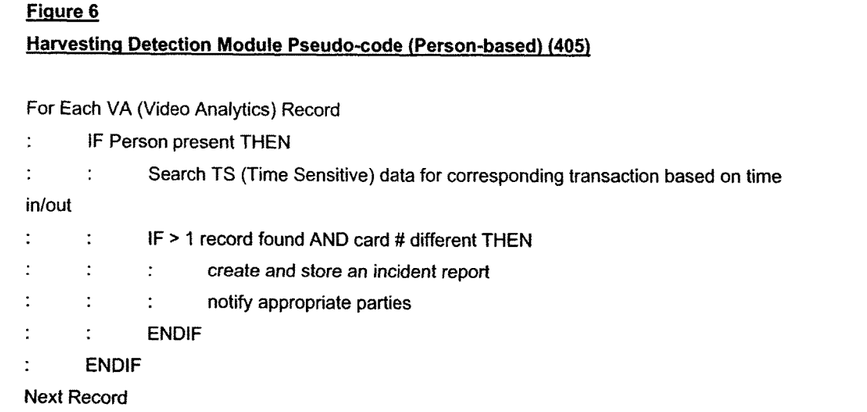
FIG. 6 is the pseudo code for a person-based harvesting detection module.
Figure 7:
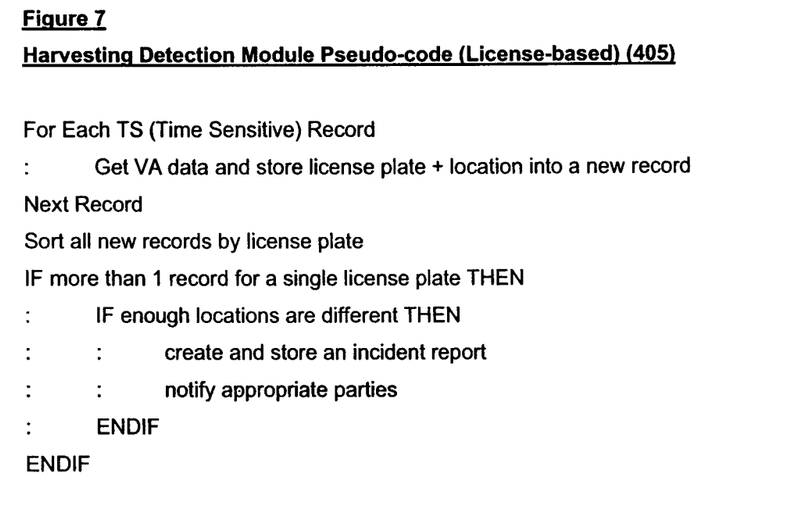
FIG. 7 is the pseudo code for a license-based harvesting detection module.
Figure 8:
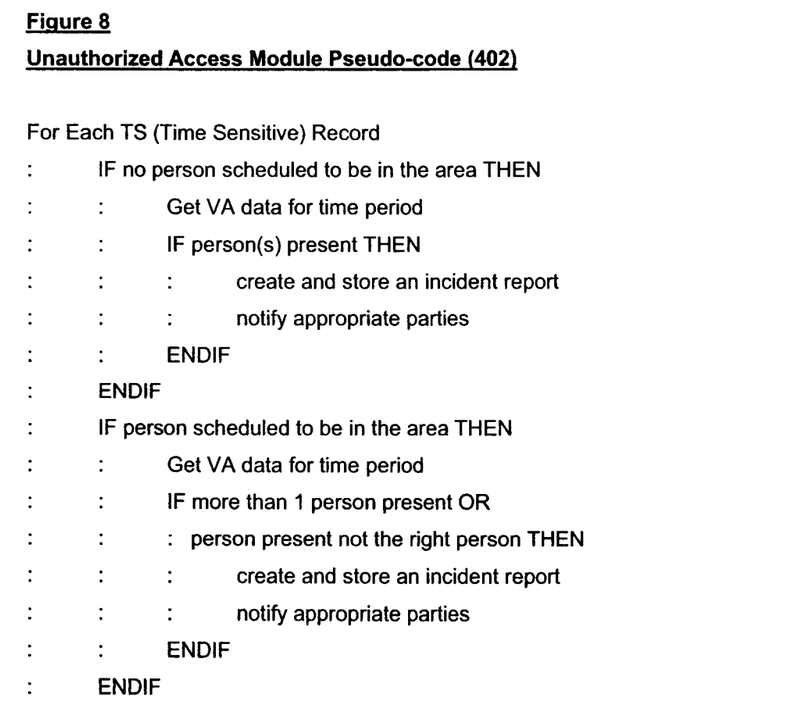
FIG. 8 is the pseudo code for an unauthorized access module.
Figure 9:
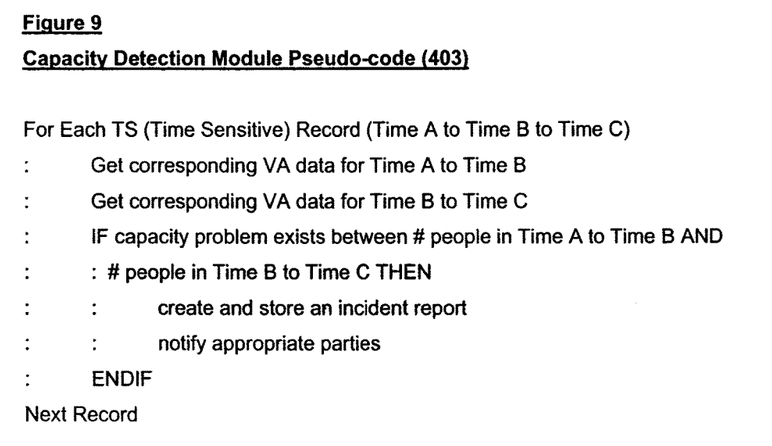
FIG. 9 is the pseudo code for a capacity detection pseudo code module.
Figure 10:
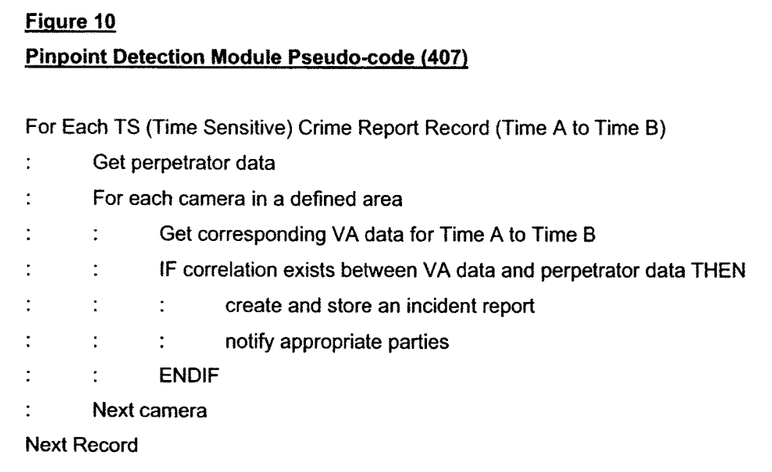
FIG. 10 is the pseudo code for a pinpoint detection module.
Figure 11:
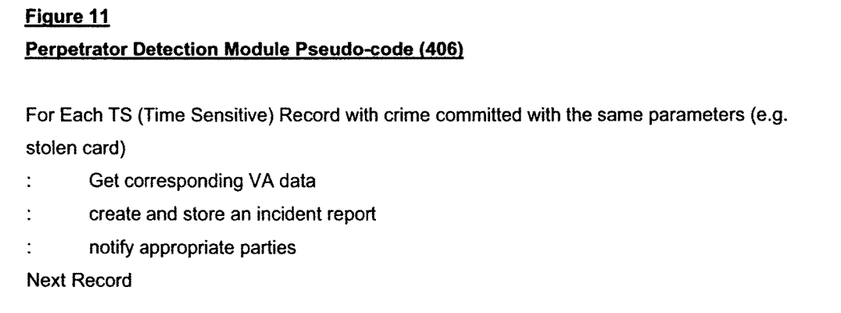
FIG. 11 is the pseudo code for a perpetrator detection module.
Figure 12:
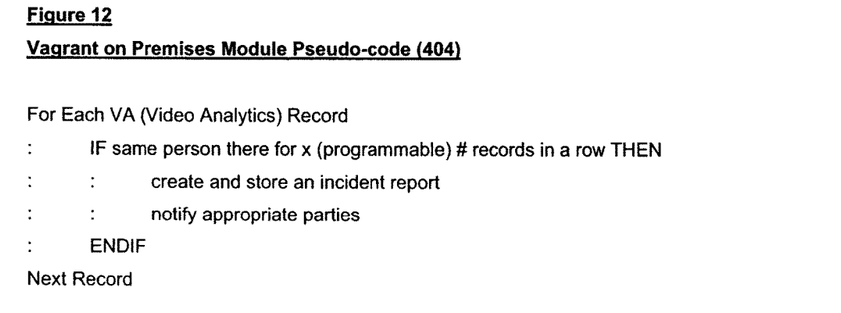
FIG. 12 is the pseudo code for a vagrant on premises detection module.

FIG. 4 shows the pluggable Correlation Modules 213 broken down into some example modules. The Control Layer Interface 400 passes the various requests to and from the different plug-in modules. These correlation modules use helper modules that perform standard functions. The helper modules are the Notification Module 408, which has stored the group of people to be notified, and how they should be notified, the Request Further Analytics Module 409, which can request that a video for a particular time period be retrieved, and further analytics be done on it by the Video Creation Module 211, and the Create and Store Incident Report Module 410, which knows how to format the information given to it into an incident report and have it stored.

The Skimming Installation Module 401 uses the data it retrieves to determine if a skimmer has been installed at a card reader site.

The Unauthorized Access Module 402 uses the data to determine if there is an unauthorized person or persons present.

The Capacity Detection Module 403 uses the data to determine if enough people are being serviced in a particular time period.

The Vagrant on Premises Module 404 determines if there is a person staying in one spot for a period of time (i.e. someone sleeping).

The Harvesting Detection Module 405 uses the data to see if the same person, or the same license plate does more than one transaction in a row using the same card reader, but different cards.

The Perpetrator Detection Module 406 correlates the use of a stolen card with videos obtained from different sites.

The Pinpoint Detection Module 407 uses the area where a crime occurred, the time that it occurred, and the video from different cameras to do an analysis to try and pinpoint the perpetrator.

Other correlation modules can be created and plugged in that use the data available to come to a conclusion and produce a report.

FIGS. 5 to 12 give examples of pseudo code executed by the modules 401 to 406 in FIG. 4.

FIG. 13 illustrates one example of video analytics that might be performed on a video stream by creation module 211 in FIG. 2.

At step 1300, a trigger occurs at time T to get an image from the video at step 1301. At step 1302 the image is analyzed and a determination made (step 1303) whether a person is in the image at time T−x, where x is a predefined time period. If not, the process terminates 1304. If yes, at step 1305, the creation module retrieves an image from the video and at time T+x and analyzes the video at step 1306 to determine if there is a different person in the image at step 1307. If the person is the same, the loop repeats from step 1305 at a later time T+2x relative to the original time T and so on. If there is a different person in the image, the loop passes to step 1309, which sets the analysis time at an intermediate time between the first and second steps. The loop repeats until no person is found in the image at step 1310.

This process thus identifies the fact that a person was present at the ATM and for how long. This metadata can be sent to the video database and stored along with the relevant images and a link to the associated video. A monitoring station can be notified by the communications server 106 in the event that a person lingers for an unusual amount of time at an ATM machine or is found at several different ATMs within a sort time-frame.

ATM fraud detection is just an example of taking two or more independent data streams, time stamped data and time stamped video, and correlating them using time and location and running an analysis to detect when relevant information is present. This correlation and analysis can be applied to other situations as well. It could be done at a point of sale terminal, when a badge is swiped, when a door is opened or closed, when an area (like a store) is open or closed, when a traffic light is red, green or yellow, when a fire alarm is pulled, etc. Any time there is video data and other time sensitive data that is being stored at the same time.

Advantages of described system include the fact that it can be used on any installed system as there is no need to change the data collector and cameras, it combines and correlates and analyzes video analytics with transaction software that is better than just video or data alone, it can be integrated with existing CCTV/Analog video systems or implemented with new state of the art IP network camera, fewer personnel are needed to view video. With standard video systems, someone must always be watching. This decreases labor costs and increases productivity.

The system also capitalizes on existing video analytics data and combines it with transaction data to expose possible fraud, not detectable by the two individually. It can be used to detect unwanted people in an area, not needing special equipment, just a video camera. It can also be offered as a central solution inside a company that has many video cameras, or as a cloud solution.

It should be appreciated by those skilled in the art that any block diagrams herein represent conceptual views of illustrative circuitry embodying the principles of the invention. For example, a processor may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. The term circuit is used herein to encompass functional blocks that may in practice be implemented in software.

The invention claimed is:

1. An analytics system comprising:
a first database for storing searchable time-stamped system metadata relating a monitored system;
a second database for storing time-stamped video metadata relating to a predetermined region associated with the monitored system;
a correlation server for processing the time-stamped system metadata and the time-stamped video metadata to identify correlation events indicating potential activity of interest in dependence upon a predetermined set of configurable rules, each configurable rule relating to detection of a predefined activity; and
an output subsystem for storing within a third database any correlation events identified by the correlation server, wherein the output subsystem generates for each correlation event a web page comprising information relating to the correlation event and a message for transmittal to a predetermined user comprising at least a link to the web page; wherein
the predetermined user is established in dependence upon the identified correlation event and an aspect of the identified correlation event; the correlation server processes the time-stamped video metadata as searchable attributes associated with a raw video data stream which have been generated by analyzing the raw video stream in accordance with a stored set of rules;
the output subsystem stores in association with a correlation event one or more corresponding video frames or corresponding raw video is stored with a correlation event;
information relating to the correlation event within the generated webpage includes the one or more corresponding video frames or corresponding raw video stored with the correlation event;

the time-stamped system metadata relating to the monitored system for storage within the first database is provided by a first time-sensitive data server at a first remote location; and the time-stamped video metadata relating to a predetermined region associated with the monitored system for storage within the second database is provided from a second time-sensitive data server at a second remote location.

2. The analytics system according to claim 1, wherein the correlation server at least one of:
   extracts from the time-stamped video metadata data indicative of the presence of a person at a monitored location;
   processes the time-stamped video metadata data to determine whether an instance of a person being present at the monitored location has occurred;
   performs a search backwards in time from a time-stamp associated with the presence of a person to establish an approximate arrival time of the person within the region monitored;
   performs a search forwards in time from a time-stamp associated with the presence of a person to establish an approximate departure time of the person within the region monitored; and
   requests additional at least one of time-stamped system metadata and time-stamped video metadata in response to an indeterminate correlation event.

3. The analytics system according to claim 1, wherein the correlation server exploits a plurality of correlation modules, each correlation module for establishing a correlation event selected from the group comprising a financial instrument skimming installation, a financial instrument harvesting activity, a transportation capacity failure, presence of a crime perpetrator, and a physical location determination.

4. A method comprising:
   providing a trigger generator for generating a trigger in dependence upon a physical event relating to a monitored system;
   generating first searchable time-sensitive metadata relating to the monitored system in dependence upon the trigger from the trigger generator;
   generating second searchable time-sensitive metadata relating to multimedia image content generated by monitoring a predetermined region associated with the monitored system in dependence upon the trigger from the trigger generator;
   determining with a correlation server in dependence upon a predetermined set of configurable rules whether a correlation event exists by processing the first searchable time-sensitive metadata and second searchable time-sensitive metadata for processing the time-stamped system metadata to identify correlation events indicating potential activity of interest;
   storing upon determination of a correlation event within a database correlation data, the correlation data comprising at least a predetermined portion of the first searchable time-sensitive metadata and a predetermined portion of the second searchable time-sensitive metadata;
   generating for each correlation event a web page comprising information relating to the correlation event; and
   transmitting to a predetermined user a message comprising at least a link to the web page; wherein the predetermined user is established in dependence upon the identified correlation event and an aspect of the identified correlation event; and each configurable rule within the predetermined set of configurable rules relates to detection of a predefined activity; the correlation server processes the second searchable time-sensitive metadata as searchable attributes associated with a raw multimedia data stream which have been generated by analyzing the raw multimedia stream in accordance with a stored set of rules relating to at least one of the potential activity of interest and the trigger generator;

the output subsystem stores in association with a correlation event one or more corresponding video frames or corresponding raw video is stored with a correlation event;

information relating to the correlation event within the generated webpage includes the one or more corresponding video frames or corresponding raw video stored with the correlation event; and the first searchable time-sensitive metadata relates to a system within a predetermined location accessible by a user and the second searchable time-sensitive metadata relates to multimedia content acquired within a predetermined region associated with the predetermined location.

5. The method according to claim 4, wherein the correlation server at least one of:
   extracts data indicative of the presence of a person at a monitored location from at least a predetermined portion of the first searchable time-sensitive metadata and a predetermined portion of the second searchable time-sensitive metadata;
   processes the at least a predetermined portion of the first searchable time-sensitive metadata and a predetermined portion of the second searchable time-sensitive metadata to determine whether an instance of a person being present at the monitored location has occurred;
   performs a search backwards in time from a time-stamp associated with the presence of a person to establish an approximate arrival time of the person within the region monitored;
   performs a search forwards in time from a time-stamp associated with the presence of a person to establish an approximate departure time of the person within the region monitored; and
   requests additional at least one of the at least a predetermined portion of the first searchable time-sensitive metadata and a predetermined portion of the second searchable time-sensitive metadata in response to an indeterminate correlation event.

6. The method according to claim 4, wherein the correlation server exploits a plurality of correlation modules, each correlation module for establishing a correlation event selected from the group comprising a financial instrument skimming installation, a financial instrument harvesting activity, a transportation capacity failure, presence of a crime perpetrator, and a physical location determination.

7. The method according to claim 4, wherein the correlation event is determined to occur based upon at least one of:
   the processing of the second searchable time-sensitive metadata absent a trigger from the trigger generator; and processing of the second searchable time-sensitive metadata together with other second searchable time-sensitive metadata from other monitored systems absent triggers from a predetermined portion of the trigger generators associated with the other monitored systems.

8. A correlation server comprising:
a first interface for receiving first searchable time-sensitive metadata relating to the monitored system;
a second interface for receiving second searchable time-sensitive metadata relating to multimedia image content generated by monitoring a predetermined region associated with the monitored system;
one or more rule-based correlation modules for processing the first searchable time-sensitive metadata and second searchable time-sensitive metadata to identify correlation events indicating a potential activity of interest, each rule-based correlation module applying a predetermined set of configurable rules; and
an output interface for generating for each identified correlation event a web page comprising information relating to the correlation event and a message for transmittal to a predetermined user comprising at least a link to the web page; wherein
the predetermined user is established in dependence upon the identified correlation event by rule-based correlation module and an aspect of the identified correlation; and
each configurable rule within the predetermined set of configurable rules relates to detection of a predefined activity; the one or more rule-based correlation modules process the time-stamped video metadata as searchable attributes associated with a raw video data stream which have been generated by analyzing the raw video stream in accordance with a stored set of rules;
the output interface stores in association with a correlation event one or more corresponding video frames or corresponding raw video is stored with a correlation event;
information relating to the correlation event within the generated webpage includes the one or more corresponding video frames or corresponding raw video stored with the correlation event;
the time-stamped system metadata relating to the monitored system for storage within the first database is provided by a first time-sensitive data server at a first remote location; and
the time-stamped video metadata relating to a predetermined region associated with the monitored system for storage within the second database is provided from a second time-sensitive data server at a second remote location.

9. The correlation server according to claim 8, wherein
the one or more correlation modules relate to establishing a correlation event selected from the group comprising a financial instrument skimming installation, a financial instrument harvesting activity, a transportation capacity failure, a presence of a crime perpetrator, and a physical location determination.

10. The correlation server according to claim 8, wherein
the correlation event is determined to occur based upon at least one of:
the processing of the second searchable time-sensitive metadata absent a trigger from the trigger generator; and
processing of the second searchable time-sensitive metadata together with other second searchable time-sensitive metadata from other monitored systems absent triggers from a predetermined portion of the trigger generators associated with the other monitored systems.

11. A method comprising:
applying a plurality of rule-based correlation modules to identify correlation events in dependence upon a predetermined set of configurable rules indicating a potential activity of interest relating to the rule-based correlation module, each rule-based correlation module processing a first predetermined portion of at least one of a first searchable time-sensitive metadata and a second searchable time-sensitive metadata;
generating for each identified correlation event a web page comprising information relating to the identified correlation event; and
transmitting a message for transmittal to a predetermined user comprising at least a link to the web page; wherein
the predetermined user is established in dependence upon the identified correlation event and an aspect of the identified correlation event; and
each configurable rule within the predetermined set of configurable rules relates to detection of a predefined activity; the plurality of rule-based correlation modules process the time-stamped video metadata as searchable attributes associated with a raw video data stream which have been generated by analyzing the raw video stream in accordance with a stored set of rules;
an output subsystem stores in association with a correlation event one or more corresponding video frames or corresponding raw video is stored with a correlation event;
information relating to the correlation event within the generated webpage includes the one or more corresponding video frames or corresponding raw video stored with the correlation event;
the time-stamped system metadata relating to the monitored system for storage within the first database is provided by a first time-sensitive data server at a first remote location; and
the time-stamped video metadata relating to a predetermined region associated with the monitored system for storage within the second database is provided from a second time-sensitive data server at a second remote location.

12. The method according to claim 11, wherein
the first predetermined portion of at least one of a first searchable time-sensitive metadata and a second searchable time-sensitive metadata were generated by a process comprising:
generating at each location of a plurality of locations first time-sensitive data, the first time-sensitive data relating to a monitored system at that location of the plurality of locations;
generating at each location of the plurality of locations second time-sensitive data relating to multimedia image content, the multimedia content generated by monitoring a predetermined region associated with the monitored system at that location of the plurality of locations;
processing the first time-sensitive data to generate first searchable time-sensitive metadata in dependence upon the monitored system at a particular location of the plurality of locations;
processing the second time-sensitive data to generate the second searchable time-sensitive metadata.

13. The method according to claim 11, wherein the first searchable time-sensitive metadata and second searchable time-sensitive metadata were previously generated and archived based upon absence of a correlation event being identified by the previous application of another rule-based correlation module.

\* \* \* \* \*